United States Patent
Wu et al.

(10) Patent No.: US 9,223,699 B2
(45) Date of Patent: Dec. 29, 2015

(54) CACHE MANAGEMENT IN MANAGED RUNTIME ENVIRONMENTS

(71) Applicant: Intel Corporation, Santa Clara, CA (US)

(72) Inventors: Keqiang Wu, San Ramon, CA (US); Kingsum Chow, Portland, OR (US); Yong-Fong Lee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 13/837,069

(22) Filed: Mar. 15, 2013

(65) Prior Publication Data

US 2014/0281230 A1 Sep. 18, 2014

(51) Int. Cl.
*G06F 12/08* (2006.01)

(52) U.S. Cl.
CPC ........ *G06F 12/0802* (2013.01); *G06F 12/0815* (2013.01)

(58) Field of Classification Search
None
See application file for complete search history.

(56) References Cited

U.S. PATENT DOCUMENTS

| 2004/0107319 A1 | 6/2004 | D'Orto et al. |
| 2008/0104344 A1 | 5/2008 | Shimozono et al. |
| 2011/0029736 A1 | 2/2011 | Sato et al. |
| 2011/0231612 A1 | 9/2011 | Karlsson et al. |
| 2011/0307663 A1* | 12/2011 | Kultursay et al. ............. 711/125 |
| 2012/0005432 A1* | 1/2012 | Joshi ............................ 711/141 |
| 2012/0089785 A1* | 4/2012 | Cho et al. ...................... 711/141 |

FOREIGN PATENT DOCUMENTS

WO 2014/151278 A1 9/2014

OTHER PUBLICATIONS

Liu, Tongping et al. "Precise Detection and Automatic Mitigation of False Sharing" Apr. 9, 2011. Retrieved from: http://people.cs.umass.edu/~emery/pubs/fs-oopsla2011.pdf.*
Bacon et al., "Space-and Time-Efficient Implementation of the Java Object Model", Proceedings of the Sixteenth European Conference on Object-Oriented Programming (ECOOP), Springer-Verlag, 2002, 21 Pages.
Dybvig et al., "Don't Stop the BIBOP: Flexible and Efficient Storage Management for Dynamically-Typed Languages", Technical Report 400, Indiana Computer Science Department, Mar. 1994, 17 Pages.
International Search Report and Written Opinion received for PCT Patent Application No. PCT/US2014/025347, mailed on Aug. 7, 2014, 11 Pages.
Venstermans et al., "Java Object Header Elimination for Reduced Memory Consumption in 64-bit Virtual Machines", ACM Transactions on Architecture and Code Optimization (TACO), vol. 4, Issue 3, Article No. 17, Sep. 2007, 30 Pages.

* cited by examiner

*Primary Examiner* — Daniel Tsui

(74) *Attorney, Agent, or Firm* — Alpine Technology Law Group LLC

(57) ABSTRACT

Methods and apparatus to provide cache management in managed runtime environments are described. In one embodiment, a controller comprises logic to determine an update frequency for an object in the runtime environment and assigning the object to an unshared cache line when the update frequency exceeds an update frequency threshold. Other embodiments are also described.

21 Claims, 4 Drawing Sheets

CACHE MANAGEMENT IN MANAGED RUNTIME ENVIRONMENTS

FIELD

The present disclosure generally relates to the field of computing. More particularly, an embodiment of the invention generally relates to cache management in managed runtime environments.

BACKGROUND

Modern computing systems enable managed runtime environments to be implemented on multicore processor systems. Many multicore processor systems utilize distributed, coherent cache memory, which gives rise to false sharing problems which, in turn, reduce performance of the system. Accordingly, techniques to reduce false sharing problems may find utility.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
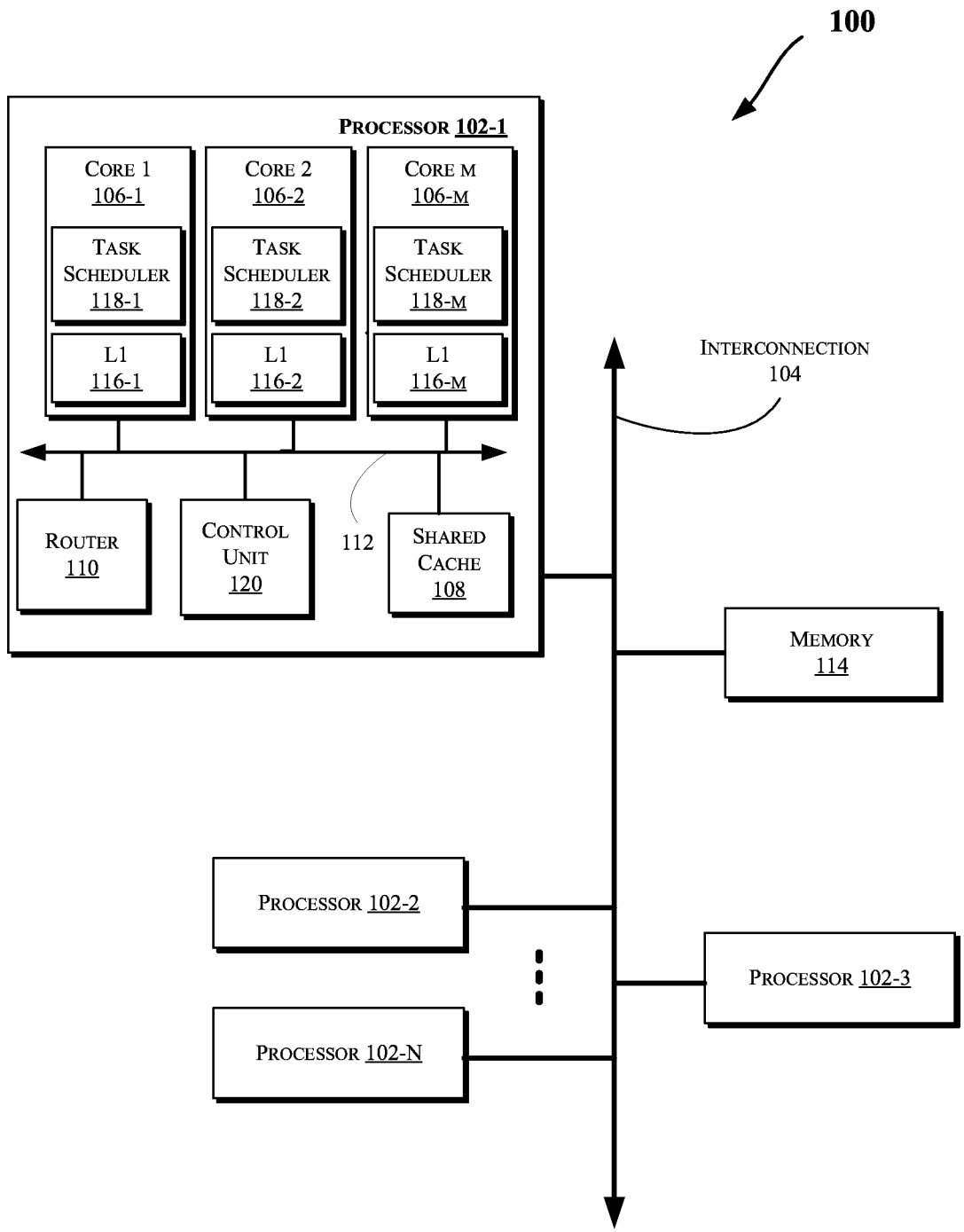
FIGS. 1-2 are schematic, block diagram illustration of an electronic device which may be adapted to implement cache management in managed runtime environments, according to some embodiments.

Described herein are various embodiments of techniques to manage cache operations in order to eliminate, or at least to reduce, false sharing problems in managed runtime environments. In general, false sharing happens when two objects or fields that are frequently accessed (either read or written) by different threads in a multiprocessor environment, at least one of the threads is doing writes, and the objects happen to be on the same cache line. With the industry trend of integrating more cores into a single system, the cache line false sharing highly-likely becomes the computer performance bottleneck. Reducing the cache line false sharing could improve the computer performance significantly.

Broad, various embodiments described herein address this issue by implementing techniques in which an update frequency is determined for objects in the managed runtime environment and objects which are frequently updated are assigned an unshared cache line. In some embodiments an update threshold may be established, e.g., by periodically compiling update frequency statistics for numerous object managed in the runtime environment. Thus, in some embodiments the update frequency threshold may be adjusted dynamically in accordance with the particular workload being managed by the managed runtime environment.

Objects which are updated more frequently than the update frequency threshold may be considered as exceeding the update frequency threshold and may be assigned to an unshared cache line. In some embodiments these objects may be padded, e.g., by inserting additional data, such that the object consumes an entire cache line. In some embodiments at least one section of the cache memory may be designated as single object line memory and these objects may be assigned to the single object line memory of the cache memory. In some embodiments the object may be designated as a complete cache line object and the assigned to an unshared cache line.

Assigning objects which are most frequently updated to unshared cache lines reduces the likelihood of false sharing events. Thus, various embodiments described herein address the technical problem of managing cache memory in managed runtime environments in order to reduce false sharing events.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software (including for example micro-code that controls the operations of a processor, firmware, etc.), or some combination thereof. Also, as discussed herein, the terms "hardware" and "logic" are interchangeable.

Figure 2:
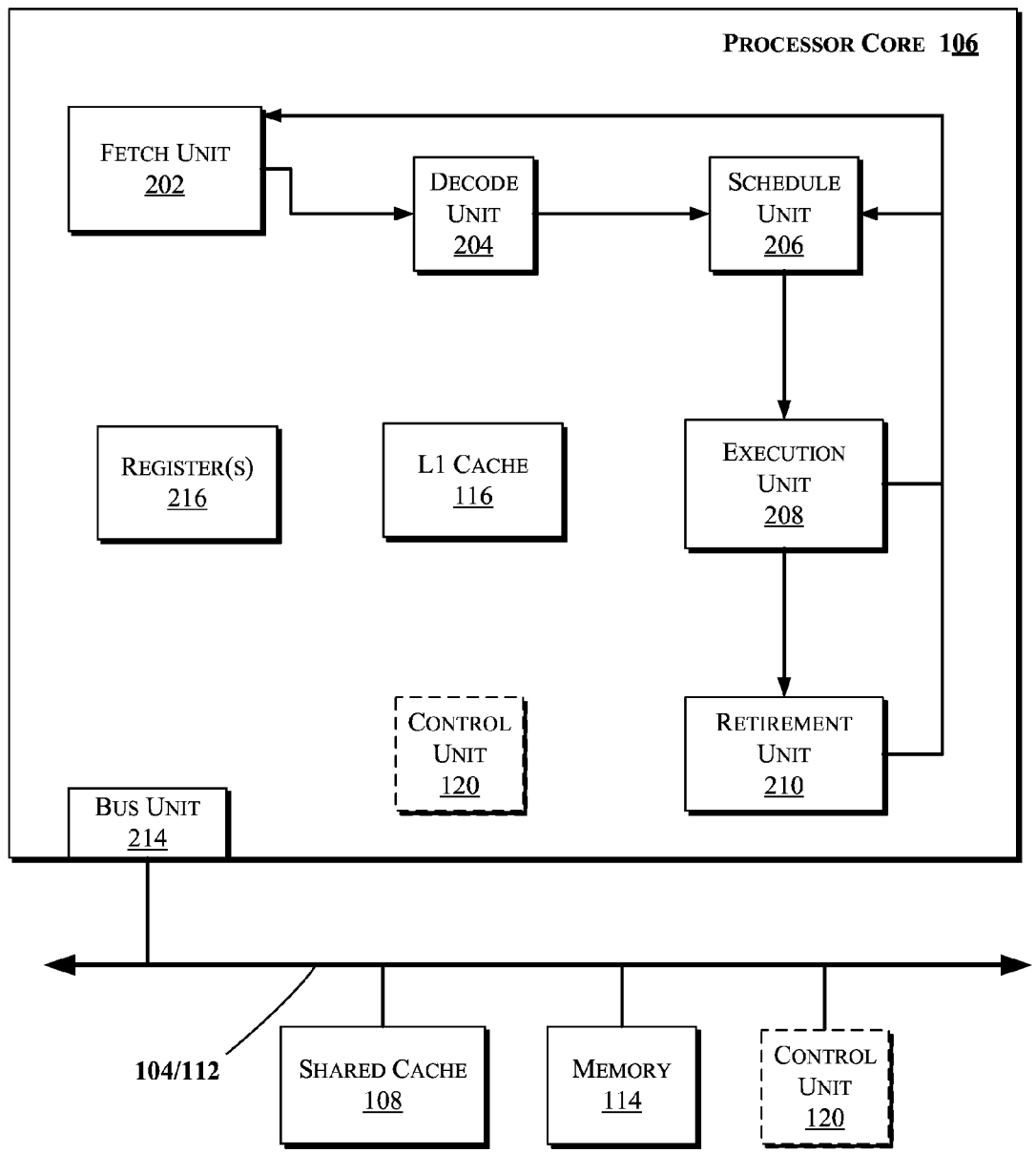

FIGS. 1-2 are schematic, block diagram illustration of an electronic device which may be adapted to implement cache management in managed runtime environments, according to some embodiments. The system 100 may include one or more processors 102-1 through 102-N (generally referred to herein as "processors 102" or "processor 102"). The processors 102 may communicate via an interconnection network or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or as an executor in the context of the description of the scheduler), a shared cache 108, a router 110, and/or a processor control logic or unit 120. The processor cores 106 may be implemented on a single integrated circuit (IC) chip. Moreover, the chip may include one or more shared and/or private caches (such as cache 108), buses or interconnections (such as a bus or interconnection network 112), memory controllers, or other components.

The processor cores 106 may comprise local cache memory 116-1 through 116-M (referred to herein as cache 116) and comprise task scheduler logic 118-1 through 118-M (referred to herein as task scheduler logic 118). The task scheduler logic 118 may implement operations, described below, to assign a task to one or more cores 106 and/or to steal a task from one or more cores 106 when the core 106 has available computing bandwidth.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache 116-1 (generally referred to herein as "L1 cache 116").

FIG. 2 illustrates a block diagram of portions of a processor core 106 and other components of a computing system, according to an embodiment of the invention. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), control units, memory controllers, or other components.

As illustrated in FIG. 2, the processor core 106 may include a fetch unit 202 to fetch instructions (including instructions with conditional branches) for execution by the core 106. The instructions may be fetched from any storage devices such as the memory 114. The core 106 may also include a decode unit 204 to decode the fetched instruction. For instance, the decode unit 204 may decode the fetched instruction into a plurality of uops (micro-operations).

Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit. The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

The core 106 may also include a bus unit 114 to enable communication between components of the processor core 106 and other components (such as the components discussed with reference to FIG. 2) via one or more buses (e.g., buses 104 and/or 112). The core 106 may also include one or more registers 216 to store data accessed by various components of the core 106 (such as values related to power consumption state settings).

Furthermore, even though FIG. 1 illustrates the control unit 120 to be coupled to the core 106 via interconnect 212, in various embodiments the control unit 120 may be located elsewhere such as inside the core 106, coupled to the core via bus 104, etc.

Figure 3:
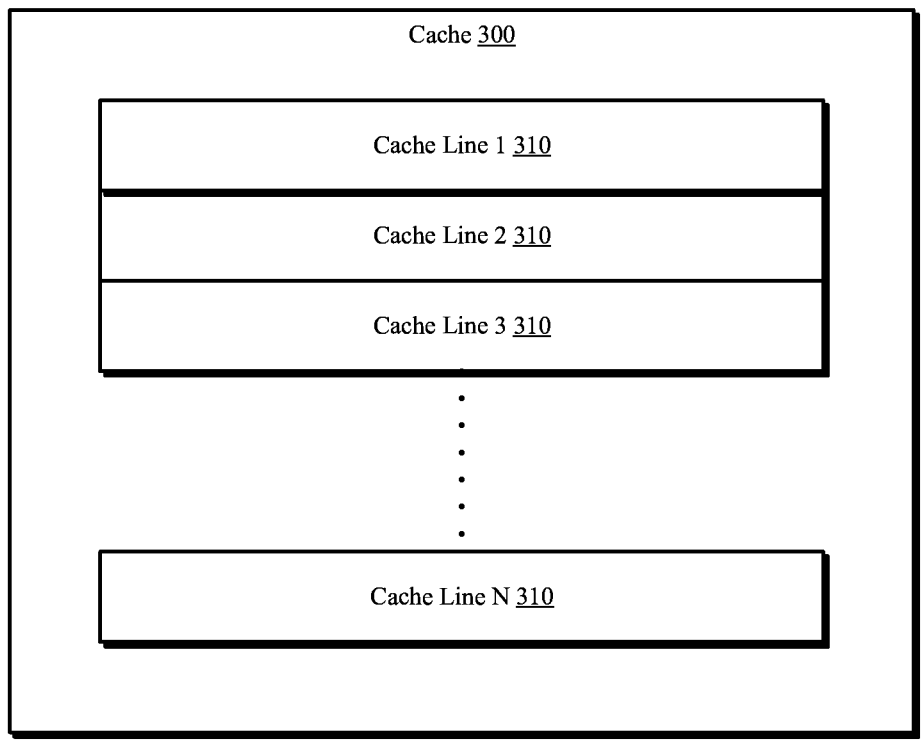
FIG. 3 is a schematic illustration of a cache memory which may be used to implement cache management in managed runtime environments, according to some embodiments.

FIG. 3 is a schematic illustration of a cache memory which may be used to implement one or more of the cache memories depicted in FIGS. 1-2. Referring to FIG. 3, in some embodiments the cache 300 comprises a plurality of cache identified in FIG. 3 as cache line 1 310, cache line 2, 310, up to cache line N. In various embodiments each cache line 310 may be 64 bytes in length and may hold up to four descriptors of 16 bytes each. The number of cache lines 310 in cache 300 is a function of the total size of the cache.

An electronic device 100 such as that depicted in FIGS. 1-2 may be used to implement a virtual machine in a managed runtime environment. Examples of managed runtime environments include a Java Virtual Machine (JVM) or a Microsoft .NET Common Language Runtime (CLR). This application will be described in the context of a JVM, but the principles apply equally to other managed runtime environments.

Figure 4:
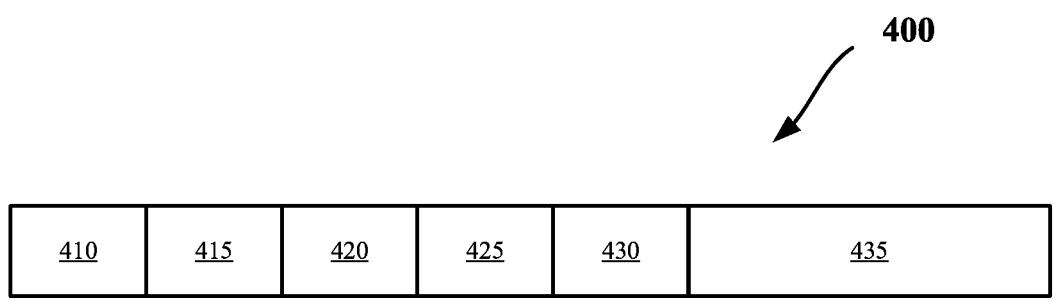
FIG. 4 is a schematic illustration of an object in a managed runtime environment, according to some embodiments.

FIG. 4 is a schematic illustration of an object in a managed runtime environment, according to some embodiments. An object in JVM, other virtual machine, or other object-oriented languages comprises one or more object data fields 435 along with a header. The header may contain a number of fields 410-430 for bookkeeping purposes. By way of example, an object header for a 64-bit JVM typically comprises the following fields:

TIB Pointer 410: The TIB (Type Information Block) pointer holds information that applies to all objects of a type. Each object points to a TIB, which could be a class object or some other related object. For example, in IBM likes Research Virtual Machine, the TIB includes the virtual method table, a pointer to an object representing the type, and pointers to a few data structures to facilitate efficient interface invocation and dynamic type checking.

Default Hash Code 415: Each Java object has a default hash code.

Lock 420: Each Java object has an associated lock state. This could be a pointer to a lock object or a direct representation of the lock.

Garbage Collection Information 425: Each JVM object has associated information used by the memory management system. Usually this comprises one or two mark bits, but it could also include some combination of a reference count, forwarding pointer, etc.

In embodiments described herein, a virtual machine object maintains a MFU (most-frequently-updated) field 430 in the header. The MFU field may be used to store a frequency update indicator which indicates how frequently the object is updated. during a time period. For example, the MFU may comprise 8 bits, i.e. 7 bits for counting how many times it has been updated and the 8th bit is set only when the update frequency exceeds a threshold (i.e. 128). Objects which are the most frequently updated objects in a virtual machine may be assigned to an unshared cache line to reduce the likelihood of false sharing in the virtual machine.

Figure 5:
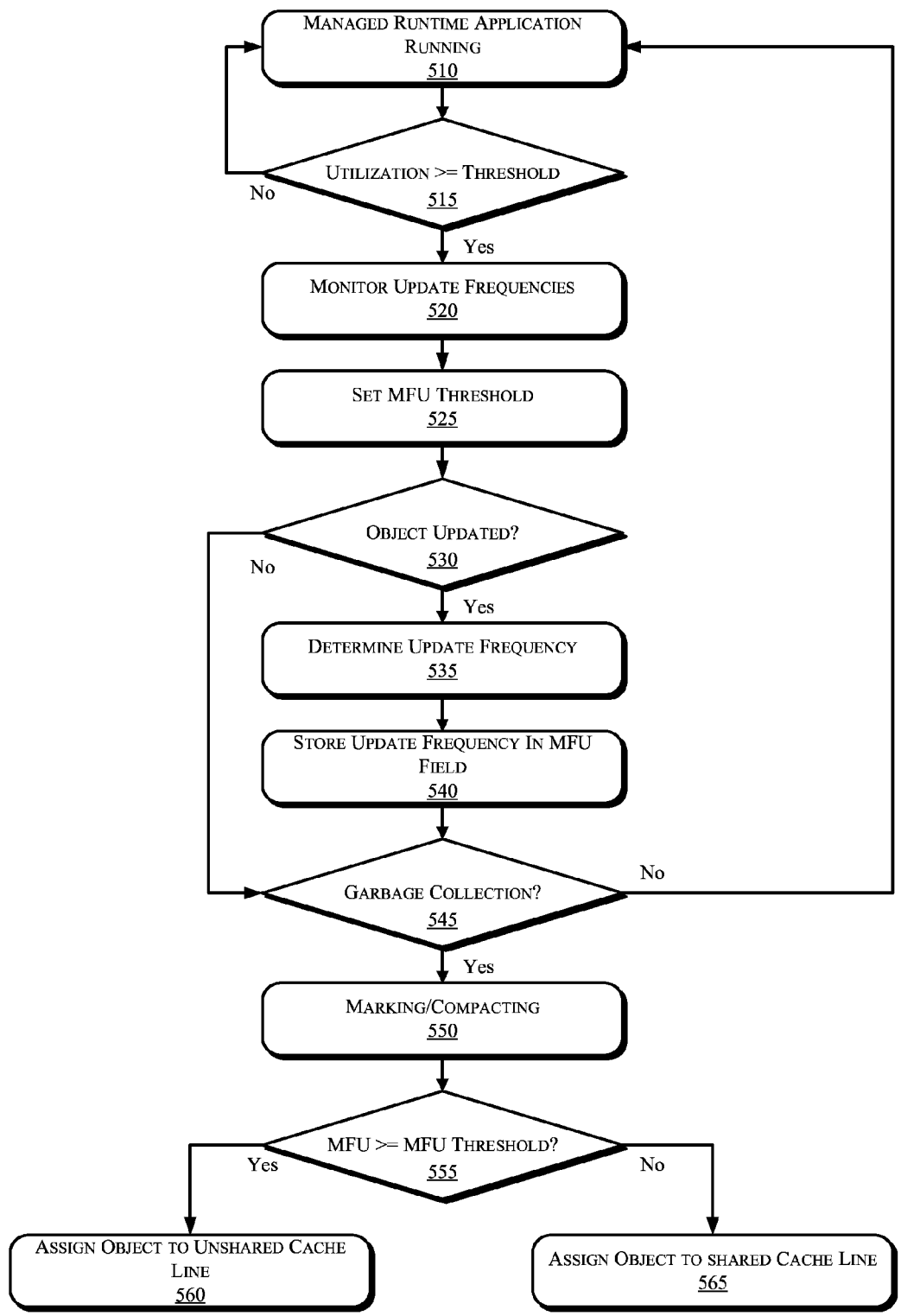
FIG. 5 is a flowchart illustrating operations in a method to implement cache management in managed runtime environments, according to some embodiments.

Having described various embodiments and configurations of electronic devices which may be adapted to implement a locality aware work stealing runtime scheduler methods to implement a method to implement cache management in managed runtime environments. FIG. 5 is a flowchart illustrating operations in a method to implement cache management in managed runtime environments, according to some embodiments. Operations of the task schedulers will be described with reference to FIG. 5.

The embodiment depicted in FIG. 5 is described within the context of a managed runtime environment. Thus at operation 510 a managed runtime application is executing on the virtual machine. The virtual machine may manage a cache memory having characteristics as described with reference to FIG. 3 and will define a plurality of objects having characteristics as described with reference to FIG. 4.

In some embodiments cache management may be implemented only when system resources are utilized at a level that is above a threshold. By way of example, in some embodiments system parameters are assessed to determine whether more than one socket is open for the application and/or if CPU utilization is above a threshold rate (e.g., 50%). If at operation 515 the utilization rate is less than the threshold then control passes back to operation 510 and the application continues to execute without active cache management.

By contrast, if at operation 515 the utilization rate meets or exceeds the threshold then control passes to operation 525 and the update frequencies of the various objects instantiated for the application are monitored and at operation 525 a most frequently updated (MFU) threshold is set. By way of example, in some embodiments the update frequencies of the various objects instantiated for the application may be monitored periodically. In some embodiments the MFU threshold may be set at a percentile of the update frequencies (e.g., 90%). In other embodiments an average or other statistical derivative of the update frequencies may be adopted.

Once the MFU threshold has been set the threshold may be applied to the respective objects instantiated for the application each time an object is updated. Thus, if at operation 530 an object is updated control passes to operation 535 and the new update frequency for the object is determined. At operation 540 the update frequency is stored in the MFU field 430 of the object.

In some embodiments objects are managed in cache memory during a periodic garbage collection process. Thus, if at operation 545 the garbage collection process is not active then control passes back to operation 510 and the process continues to monitor objects in the runtime environment. By contrast, if at operation 545 the garbage collection process is active then control passes to operation 550 and the marking/compacting process is implemented.

If, at operation 555 the MFU field of objects in the managed runtime environment at least equal to the MFU threshold determined at operation 525 then those objects are assigned to an unshared cache line (operation 560). By contrast, objects for which the MFU field is less than the MFU threshold may be assigned to shared cache lines (operation 565).

Various techniques may be used to assign objects for which the MFU field is at least equal to the MFU threshold determined at operation 525 to an unshared cache line. In some embodiments a data field of these objects may be padded such that the objects are of a sufficient size to negate the opportunity to share a cache line with another object. By way of example, in some embodiments objects may be padded during the compacting phase of the garbage collection process.

In further embodiments a section of the cache memory 300 may be designated as a single object line memory section which is allowed to hold only a single object. Objects for which the MFU field is at least equal to the MFU threshold determined at operation 525 may be assigned to the single object memory section. In further embodiments objects for which the MFU field is at least equal to the MFU threshold determined at operation 525 may be as complete cache line objects and assigned to an unshared cache line 310 in the cache.

The following examples pertain to further embodiments.

Example 1 is a computer program product comprising logic instructions stored in a non-transitory computer readable medium which, when executed by a controller, configure the controller to perform operations to manage a cache memory in a runtime environment, comprising determining an update frequency for an object 400 in the runtime environment and assigning the object 400 to an unshared cache line 310 when the update frequency exceeds an update frequency threshold.

In some embodiments the logic instructions configure the controller to perform operations comprising storing the update frequency for the object 400 in a data field in a header for the object. In some embodiments the logic instructions configure the controller to perform operations comprising monitoring an update frequency for a plurality of objects 400 in the runtime environment on a periodic basis and setting the update frequency threshold dynamically as a function of the update frequency for the plurality of objects 400.

In some embodiments the logic instructions configure the controller to perform operations comprising padding a data field 425 of the object 400 when the update frequency reaches the update frequency threshold. In some embodiments the logic instructions configure the controller to perform operations comprising unpadding the data field 425 of the object 400 when the update frequency falls below the update frequency threshold.

In some embodiments the logic instructions configure the controller to perform operations comprising designating a section of the cache memory 300 as a single object line memory section and assigning the object 400 to the single object memory section when the update frequency exceeds an update frequency threshold.

In some embodiments the logic instructions configure the controller to perform operations comprising designating the object 400 as a complete cache line object when the update frequency exceeds an update frequency threshold and assigning the object 400 to an unshared cache line 310.

Example 2 is a controller comprising logic to perform operations to manage a cache memory in a runtime environment, comprising determining an update frequency for an object 400 in the runtime environment and assigning the object 400 to an unshared cache line 310 when the update frequency exceeds an update frequency threshold.

In some embodiments the logic configures the controller to store the update frequency for the object 400 in a data field in a header for the object. In some embodiments the logic configures the controller to monitor an update frequency for a plurality of objects 400 in the runtime environment on a periodic basis and set the update frequency threshold dynamically as a function of the update frequency for the plurality of objects 400.

In some embodiments the logic configures the controller to pad a data field 425 of the object 400 when the update frequency reaches the update frequency threshold.

In some embodiments the logic configures the controller to unpad the data field 425 of the object 400 when the update frequency falls below the update frequency threshold.

In some embodiments the logic configures the controller to designate a section of the cache memory 300 as a single object line memory section and assign the object 400 to the single object memory section when the update frequency exceeds an update frequency threshold. In some embodiments the logic configures the controller to designate the object 400 as a complete cache line object when the update frequency exceeds an update frequency threshold and assign the object 400 to an unshared cache line 310.

In example 3, an electronic device comprises at least one cache memory and controller comprising logic to perform operations to manage the cache memory in a runtime environment, comprising determining an update frequency for an object 400 in the runtime environment and assigning the object 400 to an unshared cache line 310 when the update frequency exceeds an update frequency threshold.

In some embodiments the logic configures the controller to store the update frequency for the object 400 in a data field in a header for the object. In some embodiments the logic configures the controller to monitor an update frequency for a plurality of objects 400 in the runtime environment on a periodic basis and set the update frequency threshold dynamically as a function of the update frequency for the plurality of objects 400.

In some embodiments the logic configures the controller to pad a data field 425 of the object 400 when the update frequency reaches the update frequency threshold. In some embodiments the logic configures the controller to unpad the data field 425 of the object 400 when the update frequency falls below the update frequency threshold.

In some embodiments the logic configures the controller to designate a section of the cache memory 300 as a single object line memory section and assign the object 400 to the single object memory section when the update frequency exceeds an update frequency threshold. In some embodiments the logic configures the controller to designate the object 400 as a complete cache line object when the update frequency exceeds an update frequency threshold and assign the object 400 to an unshared cache line 310.

In example 4 a method to manage a cache memory in a runtime environment, comprises determining an update frequency for an object 400 in the runtime environment and assigning the object 400 to an unshared cache line 310 when the update frequency exceeds an update frequency threshold.

In some embodiments the method comprises storing the update frequency for the object 400 in a data field in a header for the object. In some embodiments the method comprises monitoring an update frequency for a plurality of objects 400 in the runtime environment on a periodic basis and setting the update frequency threshold dynamically as a function of the update frequency for the plurality of objects 400.

In some embodiments the method comprises padding a data field 425 of the object 400 when the update frequency reaches the update frequency threshold. In some embodiments the method comprises unpadding the data field 425 of the object 400 when the update frequency falls below the update frequency threshold.

In some embodiments the method comprises designating a section of the cache memory 300 as a single object line memory section and assigning the object 400 to the single object memory section when the update frequency exceeds an update frequency threshold. In some embodiments the method comprises designating the object 400 as a complete cache line object when the update frequency exceeds an update frequency threshold and assigning the object 400 to an unshared cache line 310.

In example 5 an apparatus comprises means for determining an update frequency for an object 400 in the runtime environment and means for assigning the object 400 to an unshared cache line 310 when the update frequency exceeds an update frequency threshold.

In some embodiments the apparatus comprises means for storing the update frequency for the object 400 in a data field in a header for the object. In some embodiments the method comprises means for monitoring an update frequency for a plurality of objects 400 in the runtime environment on a periodic basis and means for setting the update frequency threshold dynamically as a function of the update frequency for the plurality of objects 400.

means for padding a data field 425 of the object 400 when the update frequency reaches the update frequency threshold. In some embodiments the method comprises means for unpadding the data field 425 of the object 400 when the update frequency falls below the update frequency threshold.

In some embodiments the method comprises means for designating a section of the cache memory 300 as a single object line memory section and means for assigning the object 400 to the single object memory section when the update frequency exceeds an update frequency threshold. In some embodiments the method comprises means for designating the object 400 as a complete cache line object when the update frequency exceeds an update frequency threshold and means for assigning the object 400 to an unshared cache line 310.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Additionally, such computer-readable media may be downloaded as a computer program product, wherein the program may be transferred from a remote computer (e.g., a server) to a requesting computer (e.g., a client) by way of data signals, e.g., through a carrier wave or other propagation medium, via a communication link (e.g., a bus, a modem, or a network connection).

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A computer program product comprising logic instructions stored in a non-transitory computer readable medium which, when executed by a controller, configure the controller to perform operations to manage a cache memory in a runtime environment, comprising:
   determining an update frequency for an object in the runtime environment;
   assigning the object to an unshared cache line when the update frequency exceeds an update frequency threshold and;
   storing the update frequency for the object in a data field in a header for the object.

2. The computer program product of claim 1, further comprising logic instructions stored in the non-transitory computer readable medium which, when executed by the controller, configure the controller to perform operations comprising:
monitoring the update frequency for a plurality of objects in the runtime environment on a periodic basis; and
setting the update frequency threshold dynamically as a function of the update frequency for the plurality of objects.

3. The computer program product of claim 1, further comprising logic instructions stored in the non-transitory computer readable medium which, when executed by the controller, configure the controller to perform operations comprising:
padding a data field of the object when the update frequency reaches the update frequency threshold.

4. The computer program product of claim 1, further comprising logic instructions stored in the non-transitory computer readable medium which, when executed by the controller, configure the controller to perform operations comprising:
unpadding the data field of the object when the update frequency falls below the update frequency threshold.

5. The computer program product of claim 1, further comprising logic instructions stored in the non-transitory computer readable medium which, when executed by the controller, configure the controller to perform operations comprising:
designating a section of the cache memory as a single object line memory section; and
assigning the object to the single object memory section when the update frequency exceeds an update frequency threshold.

6. The computer program product of claim 1, further comprising logic instructions stored in the non-transitory computer readable medium which, when executed by the controller, configure the controller to perform operations comprising:
designating the object as a complete cache line object when the update frequency exceeds an update frequency threshold; and
assigning the object to an unshared cache line.

7. A controller comprising logic to perform operations to manage a cache memory in a runtime environment, comprising:
determining an update frequency for an object in the runtime environment; and
assigning the object to an unshared cache line when the update frequency exceeds an update frequency threshold; and
store the update frequency for the object in a data field in a header for the object.

8. The controller of claim 7, further comprising logic to:
monitor an update frequency for a plurality of objects in the runtime environment on a periodic basis; and
set the update frequency threshold dynamically as a function of the update frequency for the plurality of objects.

9. The controller of claim 7, further comprising logic to:
pad a data field of the object when the update frequency reaches the update frequency threshold.

10. The controller of claim 7, further comprising logic to:
unpad the data field of the object when the update frequency falls below the update frequency threshold.

11. The controller of claim 7, further comprising logic to:
designate a section of the cache memory as a single object line memory section; and
assign the object to the single object memory section when the update frequency exceeds an update frequency threshold.

12. The controller of claim 7, further comprising logic to:
designate the object as a complete cache line object when the update frequency exceeds an update frequency threshold; and
assign the object to an unshared cache line.

13. An electronic device, comprising:
at least one cache memory; and
controller comprising logic to perform operations to manage the cache memory in a runtime environment, comprising:
determining an update frequency for an object in the runtime environment; and
assigning the object to an unshared cache line when the update frequency exceeds an update frequency threshold and;
storing the update frequency for the object in a data field in a header for the object.

14. The electronic device of claim 13, wherein the controller further comprises logic to:
monitor an update frequency for a plurality of objects in the runtime environment on a periodic basis; and
set the update frequency threshold dynamically as a function of the update frequency for the plurality of objects.

15. The electronic device of claim 13, wherein the controller further comprises logic to:
pad a data field of the object when the update frequency reaches the update frequency threshold.

16. The electronic device of claim 13, wherein the controller further comprises logic to:
unpad the data field of the object when the update frequency falls below the update frequency threshold.

17. The electronic device of claim 13, wherein the controller further comprises logic to:
designate a section of the cache memory as a single object line memory section; and
assign the object to the single object memory section when the update frequency exceeds an update frequency threshold.

18. The electronic device of claim 13, wherein the controller further comprises logic to:
designate the object as a complete cache line object when the update frequency exceeds an update frequency threshold; and
assign the object to an unshared cache line.

19. A method to manage a cache memory in a runtime environment, comprising:
determining an update frequency for an object in the runtime environment; and
assigning the object to an unshared cache line when the update frequency exceeds an update frequency threshold and;
storing the update frequency for the object in a data field in a header for the object.

20. The method of claim 19, further comprising:
monitoring an update frequency for a plurality of objects in the runtime environment on a periodic basis; and
setting the update frequency threshold dynamically as a function of the update frequency for the plurality of objects.

21. The method of claim 19, further comprising:
padding a data field of the object when the update frequency reaches the update frequency threshold.

* * * * *